Nov. 2, 1954  H. F. TAPP ET AL  2,693,114
AUTOMATIC PIPE LINE SAMPLING APPARATUS
Filed June 29, 1953  3 Sheets-Sheet 1
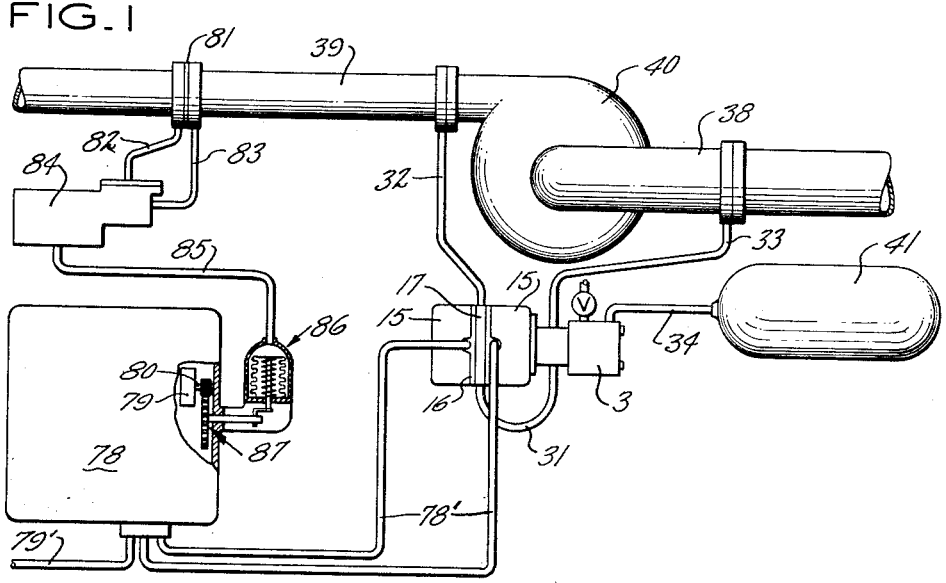
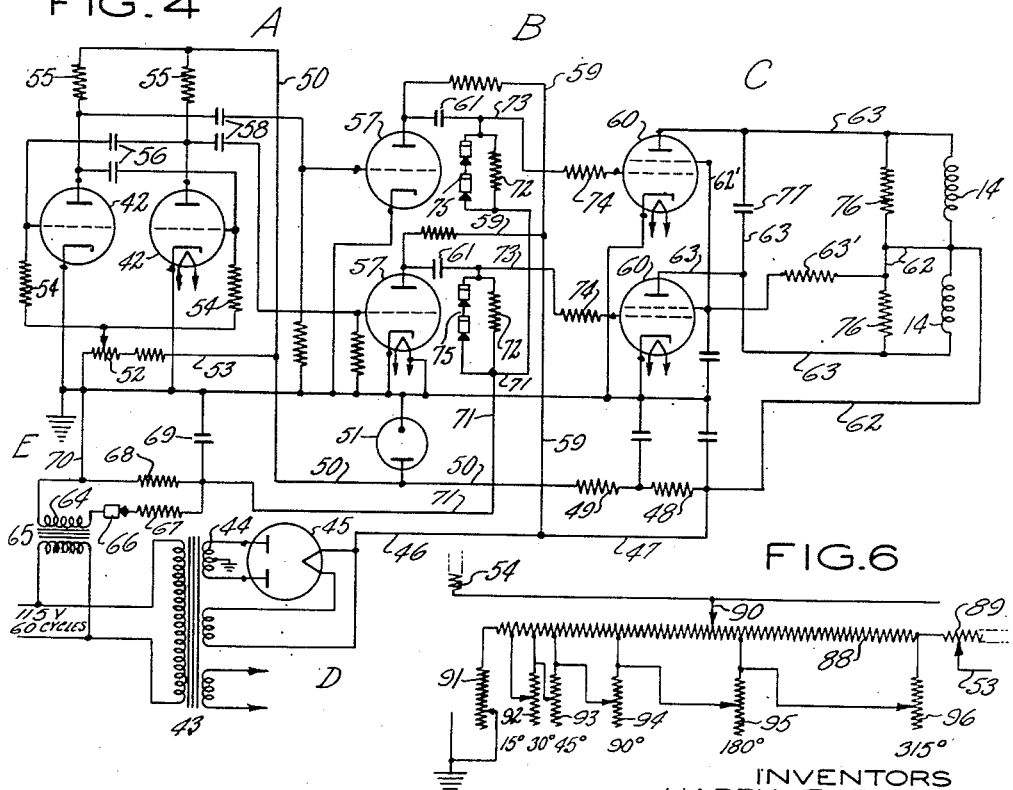
INVENTORS
HARRY F. TAPP
THEODORE J. MESH
JOHN J. PACEY
BY Chapin & Neal.
ATTORNEYS Nov. 2, 1954  H. F. TAPP ET AL  2,693,114
AUTOMATIC PIPE LINE SAMPLING APPARATUS
Filed June 29, 1953  3 Sheets-Sheet 2

INVENTORS
HARRY F. TAPP
THEODORE J. MESH
JOHN J. PACEY
BY *Chapin & Neal*
ATTORNEYS Nov. 2, 1954   H. F. TAPP ET AL   2,693,114
AUTOMATIC PIPE LINE SAMPLING APPARATUS
Filed June 29, 1953                                3 Sheets-Sheet 3

INVENTORS
HARRY F. TAPP
THEODORE J. MESH
JOHN J. PACEY
BY Chapin & Neal
ATTORNEYS

United States Patent Office 2,693,114
Patented Nov. 2, 1954

2,693,114
AUTOMATIC PIPE LINE SAMPLING APPARATUS

Harry F. Tapp, Longmeadow, Theodore J. Mesh, Easthampton, and John J. Pacey, Springfield, Mass., assignors to Gilbert & Barker Manufacturing Company, West Springfield, Mass., a corporation of Massachusetts Application June 29, 1953, Serial No. 364,622

3 Claims. (Cl. 73—422)

This invention relates to improvements in automatic pumping apparatus of the positively-acting, metering type for use with pipe lines through which fluid may flow at various rates.

The apparatus of this invention finds one advantageous use as a sampling means for periodically drawing measured quantities of fluid flowing through a pipe line. However, the apparatus is reversible and may also be used to inject measured quantities of a fluid into a pipe line to mix with the fluid flowing through the latter.

The invention has for its general object the provision of a metering pump, which will satisfactorily handle liquids that vary widely in viscosity and gravity and that may contain solids in suspension and which will operate over a wide range of pressures and deliver liquid at a pressure higher than the vapor pressure of the liquid.

The invention has for another object the provision of improved actuating means for the metering pump that will enable very small quantities to be taken from a pipe line at frequent intervals during the day in order to secure a sample which is truly representative of the liquid flowing in the pipe line and yet is not of excessive volume.

A further object of the invention is to provide actuating means for a metering pump that is characterized in that the pump is actuated intermittently in pulses and the rate of pumping is controlled by varying the frequency with which the pulses occur.

A further object is to provide in connection with pulse-actuating means for the metering pump, a means for varying the frequency of the pulses that may be controlled either manually or automatically.

A further object of the invention is to provide in pulse-actuating means for a metering pump, used for sampling liquid flowing through a pipe line, means for varying the frequency of the pulses in linear relation with variations in rate of flow in the pipe line whereby to effect proportional sampling.

These and other objects will more particularly appear from the following description of the illustrative examples of the invention shown in the accompanying drawings, in which, Fig. 1 is a small-scale diagrammatical view of a pipe line sampling apparatus embodying the invention;

Fig. 4 is an electrical diagram of an electronic pulse-generating system for actuating the metering pump;

Fig. 6 is a fragmentary electrical diagram showing a potentiometer for use in place of the potentiometer shown in Fig. 4, in order automatically to secure sampling at a rate directly proportional to pipe line flow;

Figure 2:
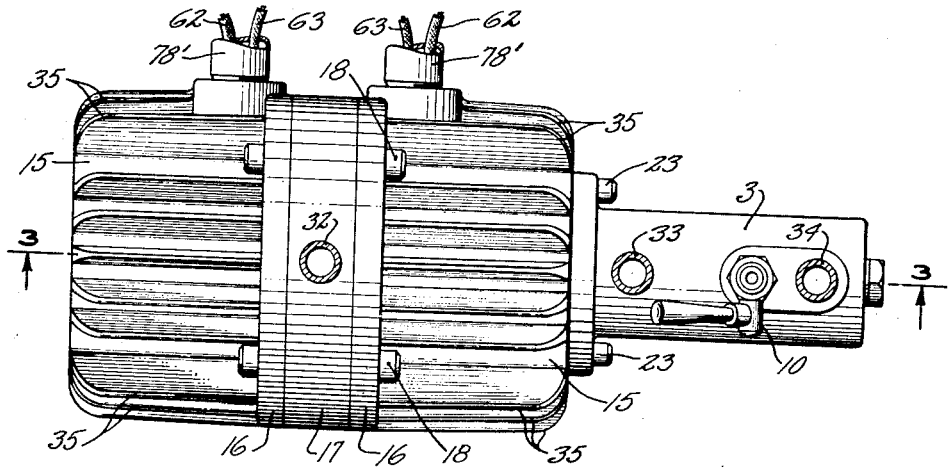
Fig. 2 is a plan view of the metering pump element of the apparatus.
Figure 3:
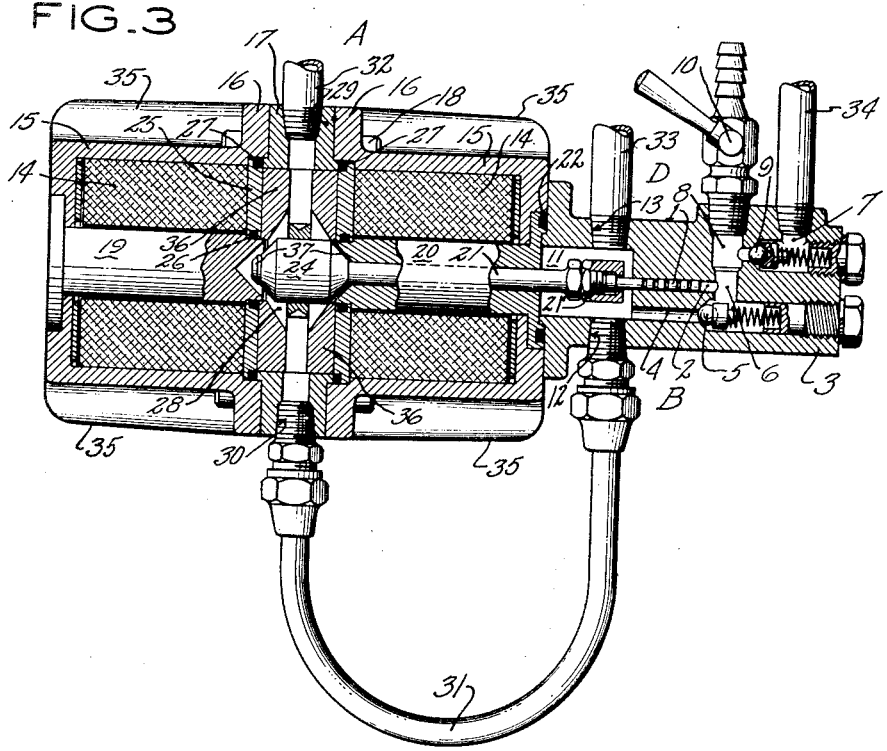
Fig. 3 is a sectional elevational view of the metering pump taken on the line 3—3 of Fig. 2.

Referring to these drawings and first to Fig. 3 thereof, the metering pump comprises a piston 1, reciprocable in a cylinder 2, formed within a body 3. The latter also affords an inlet passage 4, which is controlled by a spring-pressed inwardly-opening ball valve 5; a chamber 6, which communicates at all times with the inlet end of cylinder 2; and outlet passages 7 and 8, leading from chamber 6, the passage 7 being controlled by a spring-pressed outwardly-opening ball valve 9. The outlet passage 8 is normally closed by a valve 10 adapted for manual actuation and to be opened merely for flushing purposes. The body 3 also has a chamber 11, with which inlet passage 4 communicates and which has tapped inlet and outlet passages 12 and 13, respectively. The chamber 11 encompasses the outer end of the rod of the piston 1.

The metering pump is actuated electromagnetically. In the embodiment herein shown, this is effected by two coils 14, each mounted in a cup-shaped iron case 15. These cases are mounted in opposed relation and have flanges 16 which are clamped against opposite faces of an intervening annular ring 17 of iron by means of bolts 18. Each case 15 has a central iron core fixed to its outer end wall. One of these cores, marked 19, is solid and the other, marked 20, has a central passage therethrough to slidably receive a rod 21. The pump body 3 is clamped with an intervening O-ring 22 to the closed end wall of one case 15 by means of screws 23. The outer end of rod 21 extends into chamber 11 and is there connected by the flexible coupling 21' to the outer end of the rod of the piston 1. The inner end of rod 21 has fixed thereto an armature 24 which is of iron and has conical ends to cooperate with like recesses in the confronting inner ends of the cores 19 and 20.

The coils 14 are sealed within the recesses in their respective cases 15 by non-magnetic annular plates 25, having inner and outer O-ring seals 26 and 27, respectively. These rings 26 and 27 respectively engage the outer periphery of the core of the coil and the inner periphery of case 15. The outer ring 27 also serves to seal the joint between the adjacent end of its case 15 and the ring 17. Within this ring and between the plates 25 is a chamber 28, having tapped inlet and outlet openings 29 and 30, respectively. When the pump is used for sampling, the outlet 30 is connected by a tube 31 and suitable couplings, as indicated, to the inlet 12 in the pump body; the inlet 29 is connected by a pipe 32 to the pipe line; and the outlet 13 is connected by a pipe 33 to the pipe line and the outlet 7 is connected by a pipe 34 to a suitable sample receiver. Thus, the liquid from which small samples are to be periodically taken, may circulate in substantial volume and rapidly through the pump and its magnetic power unit in order to avoid stagnation. The liquid passing through chamber 28 serves to cool the coils 14. Also, the cases 15 of these coils are provided with fins 35 which aid still further in the dissipation of heat from the coils 14. The volume of chamber 28 may be reduced, as shown, by spacers 36 of suitable non-magnetic material.

The piston 1, as herein shown, is actuated electromagnetically. The coils 14 are energized alternately to magnetize their cores and cause the armature 24 to be moved back and forth in the space between the confronting ends of the cores. The magnetic circuit includes the end and peripheral walls of the cases 15, the ring 17 and the cores 19 and 20. When the left hand coil 14 is energized, armature 24 will be drawn to the left to move piston 1 on its suction stroke. When the right hand coil is subsequently energized, the armature 24 will be drawn back into the illustrated position to move the piston 1 on its discharge stroke. The armature preferably has spacers 37 of non-magnetic material on opposite ends to engage the adjacent ends of the cores and prevent the sticking of the armature to the cores that might otherwise occur due to residual magnetism. The length of the stroke of the piston is controlled by the length of the air gap between the armature and its cores. As shown, the stroke of the pump piston is very short and its diameter is very small, providing in this example a displacement of .0024 cubic inch.

The pump may be used to draw small samples at intervals from a by-pass that includes the pipe 32, chamber 28, tube 31, chamber 11 and pipe 33 or from the inlet 12, in which case the inlet 29 and outlet 30 of chamber 28 and the outlet 13 of chamber 11 will be closed by suitable plugs. Alternatively, the pump may be used to inject measured quantities of a fluid into a pipe line at intervals in which case, the inlet 12 will be connected to the supply of such fluid and the outlet 7 will be connected to the pipe line. Also, this fluid, which is to be injected into the pipe line, could be made to circulate through chamber 28, if desired.

The magnetic power unit, as shown, is double acting but one coil could be replaced by a spring, if desired, as is well known in the art and as is shown for example in Patent No. 2,568,757, granted September 25, 1951, on an invention of Theodore J. Mesh.

In Fig. 1, the pump is shown as connected for sampling a pipe line, having suction and discharge sides 38 and 39 and an interposed centrifugal pump 40. A fraction of the flow is caused to pass through the described by-pass, which includes pipes 32, 31 and 33, and from this by-passed stream, samples are extracted at intervals by the metering pump. The samples discharged through pipe 34 enter a sample receiver 41. The rate of pumping is controlled by varying the frequency of the strokes of piston 1 by means to be described.

The magnet coils 14 of the pump are energized periodically and alternately by suitable electrical pulses. An example of one means suitable for this purpose is shown diagrammatically in Fig. 4. Such apparatus includes a multi-vibrator section A, a buffer-amplifier section B, a power-amplifier section C, a main power supply section D, and an auxiliary power supply section E. The multi-vibrator section A is of conventional form, utilizing a dual triode 42. Power is derived from a 115 volt alternating current supply through a transformer 43, one secondary 44 of which is connected to a full-wave rectifier 45. The latter supplies direct current at 400 volts and is connected by wires 46 and 47, dropping resistors 48 and 49, which reduce the voltage to 150 volts, and wire 50 to the plate circuits of both sections of the dual triode 42. A voltage regulator 51 maintains the voltage uniform at 150 volts. Positive grid bias for the grids of both sections of the dual triode 42 is applied by an adjustable potentiometer 52, connected by a wire 53 to wire 50 and thus to the 150 volt direct-current supply. The sections of the dual triode 42 are caused to conduct or not to conduct alternately, conductivity being transferred suddenly from one section to the other. The rate of operation depends on the values of the grid resistors 54 and the plate resistors 55, the size of the coupling capacitors 56 between the two sections of the dual triode, and the value of the positive grid bias applied to both grids by the potentiometer 52. In the present example, the pulsing rate can be varied, by manual adjustment of the potentiometer, from 20 to 300 cycles per minute. The relationship between pulsing rate and grid bias is shown by the curve $a$ of Fig. 5. As there shown, the lowest rate occurs when the grid bias is zero and the highest rate, when the grid bias is 110 volts. In this example, the plate resistors 55 and the grid resistors 54 each have a resistance of 500,000 ohms and the coupling capacitors 56 each have a capacitance of 1 mfd.

The buffer-amplifier section B uses a dual triode 57, the grids of which are coupled by capacitors 58, one to each plate of the dual triode 42. The plates of triode 57 are connected by a wire 59 to the described wire 46 and thus to the 400 volt, direct-current supply. The power amplifier section C uses two tubes 60 of the beam power amplifier type. The grids of tubes 60 are coupled by capacitors 61, one to each plate of the dual triode 57. The magnet coils 14 of the metering pump are included, one in each, of the plate circuits of tubes 60. Each such plate circuit is connected to the 400 volt direct-current supply by wires 46 and 47. A wire 62 connects the wire 47 to one terminal of each coil 14, and separate wires 63 connect the other terminals of coils 14, one to each of the plates of tubes 60. The screen grids of the latter are interconnected by a wire 62' and through a resistor 63' to wire 62.

As the two sections of dual triode 42 become alternately conducting and non-conducting, voltage drops occur across their respective plate resistors 55. As a result, the plate voltage of each section of triode 42 is alternately 150 volts or about 10 volts. The coupling capacitors 58 are unable to transmit direct current potentials but they do transfer any change in voltage to the following stage. When one of the plates of the triode 42 changes its potential from plus 10 volts to plus 150 volts, a short positive pulse is transmitted to the grid of the following tube 57 and, when its potential returns from plus 150 to plus 10 volts, a negative pulse is transmitted to such grid. The duration of each pulse depends chiefly on the value of the coupling capacitor 58, which in this example, is .1 mfd. and the resistance of the grid circuit of the following tube 57, which resistance, in this example, is 1 megohm. The pulse produced, in this example, is of less than one-tenth second in duration.

The buffer stage B serves as a cushion between the stages A and C and prevents interaction between the stages A and C which might possibly affect the regularity of pulsing. It also assures that ample voltage is available to drive the power tubes 60. The coupling capacitors 61 apply short positive and negative pulses alternately to the grids of power tubes 60. The grids of these tubes are biased negatively almost to cut-off by the grid bias supply E, consisting of the secondary 64 of a transformer 65, the primary of which is connected to the 115 volt, 60 cycle alternating current supply, a rectifier 66 and resistors 67 and 68 which, in this example, have resistances of 6800 and 4700 ohms, respectively. The junction of these resistors is connected through a 10 mfd. capacitor 69 to ground and the other side of resistor 68 is connected to ground by a wire 70. The junction of resistors 67 and 68 is also connected to the grid of each tube 60 by a wire 71, a 1 megohm resistor 72, a wire 73 and a 4700 ohm resistor 74. The positive grid pulses overcome the grid bias momentarily and permit heavy pulses of current to flow alternately to the pump coils 14. The negative pulses are shorted out by two diodes 75, which connect wire 71, one to each wire 73. These negative pulses serve no useful purpose and were found to increase the average negative grid bias to an undesirable high value at fast pulsing rates, causing a reduction in pump power.

A resistor 76, which in this example, has a resistance of 50,000 ohms, is shunted across each pump coil 14. The purpose of these resistors is to reduce to a safe value the voltage transients, which ensue from the sudden switching on and off of current in the pump coils 14.

A capacitor 77 is connected across the wires 63, which connect the two pump coils 14 to the two plates of the two tubes 60. This capacitor permits a momentary oscillatory flow of current after each pulse is completed and is of value in that such current flow demagnetizes the iron elements of the pump power unit and thereby tends to eliminate any sticking between the moving and stationary magnetic elements that might otherwise be caused by residual magnetism.

Figure 5:
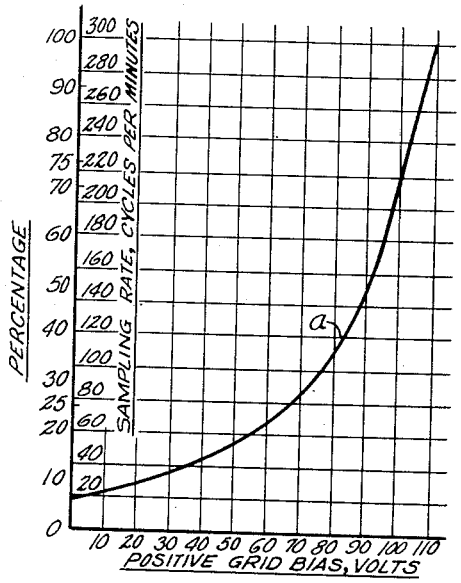
Fig. 5 is a diagram showing the relationship between grid bias and pump pulsing rate.

It will be clear that the electronic pulsing means described will alternately energize the pump coils 14 by pulses, causing the pump piston 1 to be moved on one stroke to draw in a small sample from the pipe line and subsequently to be moved on its other stroke to discharge the sample into a receiver. The potentiometer 52 is a means for controlling the frequency of these pulses and thus the frequency of the cycles of pump operation. As shown by the curve of Fig. 5, the potentiometer may be adjusted to vary the grid bias of dual triode 42 from zero to 110 volts and this results in variation of the sampling rate from about 20 to 300 cycles per minute. In the present example, the displacement of the pump piston is .0024 cubic inch and the pump delivery may be varied from .3 to 4.5 gallons per 24 hours. The potentiometer may be provided with a dial graduated as desired, as for example in percentage of the maximum sampling rate, pulses per minute, gallons per day and so forth.

In the event that the sampling pump is provided with only one coil 14, half of the buffer amplifier B and half of the power amplifier C will be omitted and, while both sections of the multi-vibrator section will be retained, the output of only one will be utilized, one of the coupling capacitors 58 being omitted. So also, one of the resistors 76 will be omitted.

The invention also provides means whereby the sampling rate may be automatically varied and preferably in linear relation to the flow in the pipe line. The same electronic pulse generating means described may be used for this purpose and the potentiometer, which controls the sampling rate, will be automatically operated by means controlled by pipe line flow. Preferably, a specially constructed potentiometer (shown in Fig. 6) is used which will cause the sampling rate to be varied in direct proportion to variations in pipe line flow, as will be later described.

Figure 8:
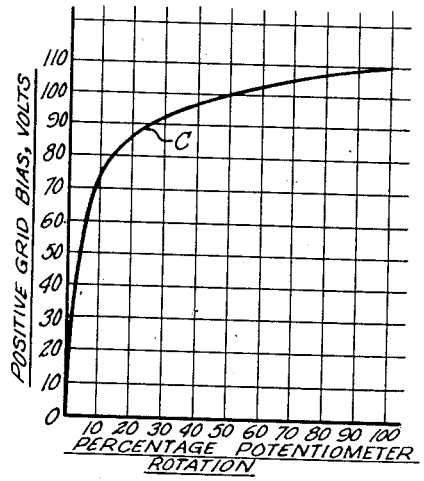
Fig. 8 is a diagram showing the relationship between potentiometer rotation and grid-base voltage necessary to secure sampling at a rate proportional to pipe line flow.
Figure 7:
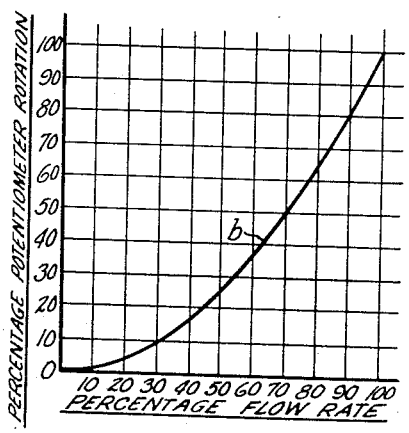
Fig. 7 is a diagram showing the relationship between pipe line flow and potentiometer rotation.

One suitable means for actuating the potentiometer is shown diagrammatically in Fig. 1. The control apparatus illustrated in Fig. 4, is contained within a casing 78, which has been partly broken open to show the potentiometer, marked 79, and its operating shaft 80. Conduits 78′ connect casing 78 to the casing of the metering pump to house the wires 62 and 63 and a conduit 79′ contains the supply wires. The force for turning the potentiometer shaft 80 is derived from the flow through pipe line 39 in any suitable way. A standard means, well known in the petroleum industry, has been indicated diagrammatically. An orifice plate 81 is inserted in the pipe line. Tubes 82 and 83 lead from the pipe line on opposite sides of the orifice plate to a differential converter 84, in which the liquid pressure differential is converted into air pressure. This air pressure is transmitted by a tube 85 to a pneumatic motor 86 that operates by a suitable transmission 87 to turn the potentiometer shaft 80. The relationship between rotation of shaft 80 and rate of flow in pipe line 39 is shown by the curve $b$ of Fig. 7. From this curve and the curve $a$ of Fig. 5, can be plotted the curve $c$ of Fig. 8 which shows the grid bias in volts required for various percentages of rotation of the potentiometer shaft 80 in order to secure a pump-pulsing rate that is linearly proportional to the rate of pipe line flow. From Fig. 8, the full line curve $d$ of Fig. 9 can be plotted, showing the percentage of resistance of the potentiometer required for various degrees of rotation of shaft 80. Then, a potentiometer is designed that will operate as closely as feasible to the theoretical requirements. The actual performance of the potentiometer, in this case, is shown by the dotted line cure $e$.

Figure 9:
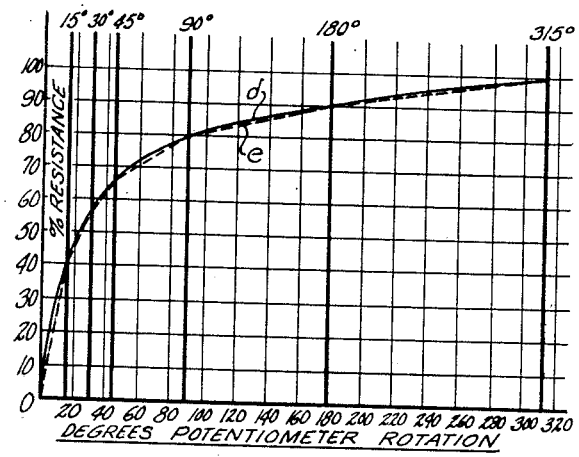
Fig. 9 is a diagram showing the operation of the potentiometer of Fig. 6 compared with the theoretical requirements.

The potentiometer is shown in Fig. 6. It includes a resistor 88, having a resistance of 50,000 ohms uniformly distributed over an arc of 315° and having taps at 15°, 30°, 45°, 90° and 180° and end terminals at zero and 315°. The 315° terminal is connected through an adjustable series resistor 89 (in this example having a resistance of 3080 ohms) to the 150 volt supply wire 53, heretofore described in connection with Fig. 4. This resistor 89 drops the voltage from 150 to 110 volts. The output terminal 90 of the potentiometer is connected, as described in connection with Fig. 4, to the grid resistors 54. The zero terminal of the potentiometer is connected through an adjustable resistor 91 (in this case having a resistance of 2308 ohms) to the ground wire. This resistor 91 is really part of the potentiometer and causes a drop of 30 volts. Adjustable shunting resistors 92, 93, 94, 95 and 96 are respectively connected between the 15° and 30° taps, the 30° and 45° taps, the 45° and 90° taps, the 90° and 180° taps and the 180° and 315° taps for the purpose of modifying the potentiometer resistance between various taps and making its performance curve match, as closely as feasible, the curve that is theoretically required. In Fig. 9, the full line curve $d$ represents the theoretical requirement and the dotted line curve $e$ the actual performance curve of the potentiometer. The curve $e$ matches the curve $d$ within one per cent. The following table gives the data for the potentiometer as worked out in the present example.

| Potentiometer Section | Original Resistance | Modified Resistance | Shunt Resistance Required | Variable Resistors |
|---|---|---|---|---|
| 0°–15° | 2,380 | 2,380 | None | None |
| 15°–30° | 2,380 | 1,040 | 1,850 | 92 0–3,0°0 |
| 30°–45° | 2,380 | 560 | 733 | 93 0–2,030 |
| 45°–90° | 7,140 | 850 | 965 | 94 0–2,030 |
| 90°–180° | 14,280 | 700 | 737 | 95 0–2,000 |
| 180°–315° | 21,440 | 620 | 638 | 96 0–1,000 |
| Sum | 50,000 | 6,150 | | |

The described sampling circuit is not capable of proportional performance down to zero in any event and the necessary use of the series resistor 91 will limit proportional sampling to flow rates of ten per cent and more which is satisfactory as a practical matter. The performance of the apparatus for flow rates within such a range is shown in the following table:

| Percent Flow Rate | Percent Pot. Rotation | Grid Bias, Volts | Percent Sampling Rate |
|---|---|---|---|
| 10 | 1.00 | 24.0 | 10 |
| 20 | 4.00 | 56.5 | 20 |
| 30 | 9.00 | 73.7 | 30 |
| 40 | 16.00 | 83.8 | 40 |
| 50 | 25.00 | 90.6 | 50 |
| 60 | 36.00 | 95.8 | 60 |
| 70 | 49.00 | 99.8 | 70 |
| 80 | 64.00 | 103.3 | 80 |
| 90 | 81.00 | 106.8 | 90 |
| 100 | 100.00 | 110.0 | 100 |

It will thus be clear that, given the data concerning the relationship between control voltage for the multivibrator and pump-pulsing rate and the data concerning the relationship between rates of pipe line flow and degrees of movement of the movable element of the potentiometer, values can be calculated to modify a potentiometer, having the necessary taps, to make an automatic proportional sampling device.

The invention thus provides a pumping apparatus, which may be used to extract very small measured quantities of liquid at frequent intervals from a pipe line for sampling or it may equally well be used to inject small measured quantities of material into a pipe line. The total quantity per day that is extracted or injected, as the case may be, can be varied over a substantial range, as in the present example from three tenths of a gallon to four and one half gallons. The quantity pumped is varied by varying the frequency at which the pulses are generated. The frequency of the pulses may vary from 20 cycles per minute, which provides relatively slow intermittent pumping, to 300 cycles per minute which provides continuous pumping. The timing of the pulses may be varied manually or automatically, as desired, and, when the timing is varied automatically, it may be controlled by the flow in the pipe line and be varied proportionally to variations in such flow.

What is claimed is:

1. An automatic sampling apparatus for use in intermittently obtaining samples of a fluid flowing through a pipe line, comprising, a conduit having inlet and outlet ends adapted for connection to a pipe line at longitudinally-spaced locations and for continuously by-passing therethrough a portion of the stream of fluid flowing in such line, a reciprocating-piston pump having a valve-controlled inlet connected to said conduit intermediate said ends and a valve-controlled outlet adapted for connection to a sample receiver, electromagnetic means controlling the reciprocation of the piston of said pump, means for periodically producing electrical pulses, electric circuit means for transmitting such pulses to said electromagnetic means, and means responsive to the rate of flow in the pipe line for varying the frequency of the pulses proportionately to the variations in flow through such line.

2. An automatic sampling apparatus for use in intermittently obtaining samples of a fluid flowing through a pipe line, comprising, a conduit having inlet and outlet ends adapted for connection to a pipe line at longitudinally-spaced locations and for continuously by-passing therethrough a portion of the stream of fluid flowing in such line, a reciprocating-piston pump having a valve-controlled inlet connected to said conduit intermediate said ends and a valve-controlled outlet adapted for connection to a sample receiver, electromagnetic means controlling the reciprocation of the piston of said pump, means for periodically producing electrical pulses, electric circuit means for transmitting such pulses to said electromagnetic means, and means including a potentiometer having a movable contact for varying the frequency at which said pulses are produced, and means responsive to the rate of flow through said pipe line for moving said contact proportionately to variations in said rate of flow.

3. An automatic sampling apparatus for use in intermittently obtaining samples of a fluid flowing through a pipe line, comprising, a conduit having inlet and outlet ends adapted for connection to a pipe line at longitudinally-spaced locations and for continuously by-passing therethrough a portion of the stream of fluid flowing in such line, a reciprocating-piston pump having a valve-controlled inlet connected to said conduit intermediate said ends and a valve-controlled outlet adapted for connection to a sample receiver, electromagnetic means controlling the reciprocation of the piston of said pump, means for periodically producing electrical pulses, electric circuit means for transmitting such pulses to said electromagnetic means, and means for varying the frequency at which such pulses are produced and thus the frequency at which said piston is reciprocated.

References Cited in the file of this patent

UNITED STATES PATENTS

| Number | Name | Date |
| --- | --- | --- |
| 1,925,934 | Rinstad | Sept. 5, 1933 |
| 2,460,064 | Curtis | Jan. 25, 1949 |
| 2,473,726 | Payne | June 21, 1949 |
| 2,578,902 | Smith | Dec. 18, 1951 |
| 2,581,806 | McShirley | Jan. 8, 1952 |
| 2,596,943 | Sheen | May 13, 1952 |

FOREIGN PATENTS

| Number | Country | Date |
| --- | --- | --- |
| 436,762 | Italy | June 14, 1948 |
| 937,421 | France | Aug. 17, 1948 |